United States Patent Office 3,161,119
Patented Dec. 15, 1964

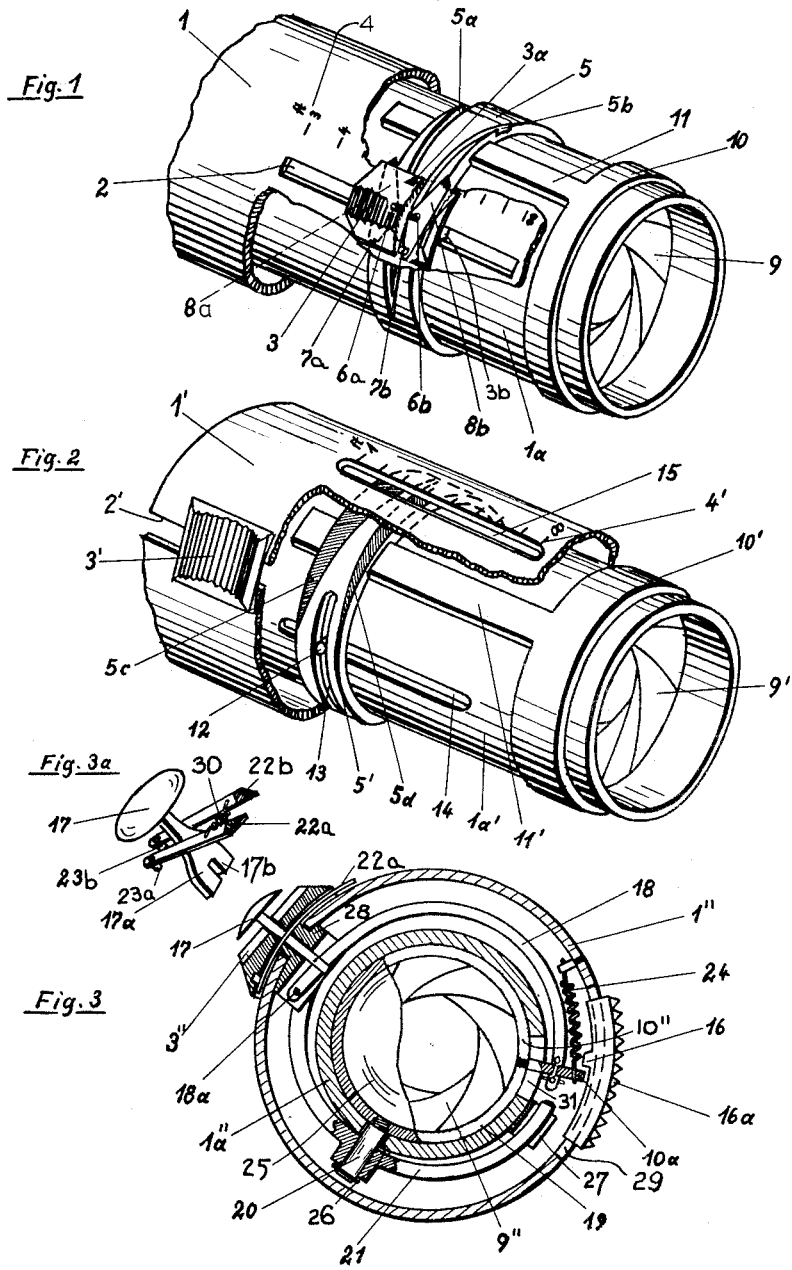

3,161,119
DEPTH-OF-FIELD INDICATOR FOR OPTICAL OBJECTIVE WITH AXIALLY SHIFTABLE FOCUSING MEANS
Herbert Mahn, Kreuznach, Rhineland, Germany, assignor to Josef Schneider & Co., Optische Werke, Kreuznach, Rhineland, Germany, a corporation of Germany
Filed Dec. 22, 1961, Ser. No. 161,658
Claims priority, application Germany, Jan. 25, 1961, 29,113/61
12 Claims. (Cl. 95—45)

My present invention relates to a depth-of-field indicator for a photographic or cinematographic camera objective in which an axially shiftable control element is used to focus the objective by correspondingly displacing one or more components thereof.

In certain instances, particularly in the case of objectives of large focal length such as those of the telephoto type, it is desirable to dispense with the usual focusing ring threadedly engaging an axially shiftable lens barrel and to utilize instead an axially displaceable slider as the focusing means. The slider may be connected directly with the lens barrel or, as more particularly disclosed in my copending application Ser. No. 161,659 of even date entitled "Focusing Mechanism for Photographic or Cinematographic Objectives," now Patent No. 3,122,079, may be indirectly coupled therewith through suitable transmission means such as an arcuate lever for reducing the rate of displacement of the lens assembly relative to that of the slider.

It is an object of the present invention to provide means for indicating the depth of field in an objective of this type provided with an adjustable diaphragm so that, as is known per se, the diaphragm setting must be taken into account in determining the spread of the depth-of-field range.

A more specific object of this invention is to provide means to indicate depth of field in a telephoto or similar objective of the type disclosed in my above-identified co-pending application.

In accordance with this invention I provide, in combination with an axially displaceable slider or equivalent control means, an indicator member which is axially entrainable by the slider and is further displaceable, in a plane transverse to the objective axis, under the control of a diaphragm-adjusting device such as a rotatable setting ring. This displacement within the transverse plane may be rotary, in which case the member is advantageously a ring coupled directly with the diaphragm-setting ring, or radial, this being particularly suitable for a system wherein a radially depressible button or stud is used on the slider to open the diaphragm wide during focusing and to release it to a preselected stop position as also disclosed in my copending application above referred to. The depth of field can be read in either case on an axially extending distance scale with the aid of indicator means including a pair of relatively inclined boundaries on the axially entrainable member, these boundaries establishing the limits of the measured range either by mechanical action upon a pair of pointers or by direct visual alignment with the scale markings.

The invention will be better understood from the following detailed description of certain embodiments, reference being made to the accompanying drawing in which:

FIG. 1 is a perspective view of an objective embodying the invention;

FIG. 2 is a similar perspective view of a modified objective according to the invention;

FIG. 3 is a cross-sectional view looking toward the rear of an objective according to a further modification; and FIG. 3a is a perspective view of a detail of the embodiment of FIG. 3.

The objective shown in FIG. 1 comprises a housing which is composed of an outer shell 1 and an inner cylinder 1a coaxial therewith; a rearward extension, not shown, of shell 1 serves to attach it to the body of a camera which has likewise not been illustrated.

Shell 1 is provided on its periphery with an axially extending guide slot 2 for a slider 3 which bears a mark 3a co-operating with a distance scale 4 alongside the slot. A ring 5, forming part of the indicator assembly, is slidable and rotatable within shell 1 on cylinder 1a and is straddled by prongs 3b (only one shown) of slider 3 which pass through the slot 2. Ring 5 is provided on its outer surface with a pair of symmetrically converging camming grooves 5a, 5b which accommodate respective pins 6a, 6b on a pair of pointers 8a, 8b that are pivoted to the underside of slider 3 at 7a and 7b, respectively, the pins 6a and 6b extending through the slot 2 between the prongs 3b. An iris diaphragm 9 of the rear of cylinder 1a is adjustable with the aid of a setting ring 10 in a manner known per se, the ring being integral with an axially extending arm 11 engaging a groove within ring 5 for rotatably entraining same while permitting its axial displacement by the slider 3. A lens barrel, not shown in FIG. 1 but partly visible at 19 in FIG. 3, is axially slidable within the cylinder 1a and is coupled, either directly or through a lever system as described hereinafter in connection with FIG. 3, with the prongs 3b of slider 3; one of the lenses carried by this barrel has also been partly shown at 25 in FIG. 3.

In operation, as will be readily apparent, the user displaces the slider 3 along slot 2 until the mark 3a registers the desired distance along scale 4; this shifts the indicator ring 5 axially within the annular clearance between housing parts 1 and 1a while any adjustment of the setting ring 10 imparts to the ring 5 a motion in a plane transverse to the optical axis of the system, i.e. a rotation about that axis. The tips of pointers 8a and 8b define on the scale 4 the proximal and distal limits of the depth-of-field range, the spacing of these tips remaining constant for any given setting of diaphragm 9 and its control ring 10. When the latter ring is rotated clockwise to open the diaphragm, the convergence of grooves 5a, 5b reduces the separation of the pointer tips to indicate the correspondingly narrowed range of sharp focusing; with opposite rotation of ring 10, i.e. progressive closure of diaphragm 9, the pointers are caused to diverge as the effective depth-of-field range increases.

In FIG. 2, wherein elements similar to those of FIG. 1 have been designated by the same reference characters supplemented by a prime ('), scale 4' has been offset from the slot 2', which guides the slider 3', while another longitudinal slot 15 on shell 1' forms a window for the viewing of a narrow zone of indicator ring 5'. This ring is here provided with a peripheral slot 13 traversed by a pin 12 which extends outwardly from the lens barrel through a slot 14 in cylinder 1a'; the ring 5' thus travels at the rate of the lens barrel rather than at that of the slider. Two colored, engraved or otherwise distinctively surfaced zones 5c, 5d on ring 5' form a pair of converging edges which delimit the depth-of-field range on the scale 4' when viewed through the window slot 15. In this embodiment the diaphragm 9' has been assumed to close upon clockwise rotation of setting ring 10' which by its arm 11' entrains the ring 5' to indicate an increased spread of the depth-of-field range upon such clockwise rotation.

In FIG. 3 I have illustrated the manner in which the lens barrel 19 is axially displaceable by the slider 3" at a proportionally reduced rate, as disclosed at length in my copending application referred to above. A lever 21 of semiannular configuration is pivoted at an intermediate point to the lens barrel 19 by means of a pin 20 passing through a longitudinal slot 26 in housing cylinder 1a". One end of lever 21 is articulated to the cylinder 1a" by passing with freedom of swiveling motion between lugs 27 (only one shown) on the outer surface thereof; the other end of this lever is similarly articulated to the base 28 of slider 3". This base 28 has also pivoted to it, at 18a, another arcuate lever 18 which is looped around the opposite side of the tubular assembly 1a", 19 and, at its end remote from slider 3", engages a projection 10a which extends radially outwardly from the setting ring 10" of diaphragm 9". Projection 10a, which is provided with an axial slot to accommodate the end of lever arm 18 with freedom of axial displacement by slider 3", extends along the objective axis over a sufficient distance to accommodate the range of displacement of the slider without undue deformation of arm 18. A spring 24 tends to maintain the projection 10a in contact with a stop 16 on a diaphragm selector 16a which is angularly displaceable within a slot 29 of shell 1" and can be held, frictionally or by suitable indexing means not shown, in different positions corresponding to selected diaphragm stops.

Slider 3" is apertured and traversed by the shank 17a of a manually depressible stud 17, this shank being generally wedge-shaped and forming at its inner end a recess 17b to straddle the lever arm 18 (see FIG. 3a). A pair of pointers 22a, 22b are pivoted to the underside of the slider 3" at 23a, 23b, respectively, and are urged by a spring 30 into camming engagement with opposite, diverging edges of the shank 17a. The tips of pointers 22a and 22b play on a distance scale, not shown, in the same manner as do the tips of pointers 8a, 8b in FIG. 1.

The system of FIGS. 3 and 3a is particularly adapted for use with a reflex-type camera, enabling focusing of the objective by the direct observation of an image projected by it, even though it may also be used in a camera whose film support can be replaced by a groundglass plate for focusing purposes. In this case it is desirable to open the diaphragm wide during focusing, this being accomplished by manual depression of the stud 17 as the slider 3" is gripped for displacement along the objective axis. Radial movement of the shank 17a has the effect of swinging the lever 18 about its pivot 18a, against the force of spring 24, to disengage the projection 10a from its stop 16 and to rotate it clockwise, within the limits of a cutout 31 in housing cylinder 1a", to adjust the diaphragm 9" to its fully opened position. The same movement causes the contraction of the pointers 22a, 22b by the spring 30 whereby a reduced depth-of-field range will be indicated on the associated distance scale. Generally, however, the user after focusing will release the stud 17 whereby projection 10a returns to engagement with stop 16, thereby restoring the diaphragm to its preselected aperture; the resulting outward displacement of stud 17 causes the pointers 22a, 22b to spread again and to indicate the depth of field corresponding to the reduced diaphragm aperture.

It is to be understood that my invention is not limited to the specific details of construction described and illustrated but may be realized in various modifications and adaptations without departing from the spirit and scope of the appended claims.

I claim:

1. A camera objective comprising a stationary housing, a lens support slidable in said housing in the direction of the objective axis; control means for said lens support slidable on said housing in the direction of said axis; transmission means linking said control means with said support for concurrent axial displacement; an adjustable diaphragm in said housing provided with setting means, said housing carrying an axially extending distance scale; a member axially entrainable by said control means with freedom of displacement in a plane transverse to said axis, said member having a portion with a pair of relatively inclined boundaries; indicator means including said boundaries for marking on said scale a variable range of distance representing depth of field, the extent of said range varying with the position of said member within said plane; and coupling means linking said setting means with said member for correlating the transverse displacement thereof in said plane with an adjustment of said diaphragm.

2. A camera objective comprising a stationary housing, a lens support slidable in said housing in the direction of the objective axis; control means for said lens support slidable on said housing in the direction of said axis; transmission means linking said control means with said support for concurrent axial displacement; an adjustable iris diaphragm in said housing provided with a setting ring rotatable about said axis, said housing carrying an axially extending distance scale; a member axially entrainable by said control means and coupled with said setting ring for displacement thereby in a plane transverse to said axis, said member having a portion with a pair of relatively inclined boundaries; indicator means including said boundaries for marking on said scale a variable range of distance representing depth of field, the extent of said range varying with the position of said member within said plane; and coupling means linking said setting ring with said member for correlating the transverse displacement thereof in said plane with an adjustment of said diaphragm.

3. An objective according to claim 2 wherein said member is annular and rotatable about said axis jointly with said setting ring.

4. An objective according to claim 3 wherein said housing is provided with an axially extending peripheral slot, said control means including a slider on said housing displaceable along said slot, said member being displaceabel in said housing in the region of said scale and being coupled with said slider through said slot.

5. An objective according to claim 4 wherein said indicator means further includes a pair of swingable pointers on said slider, said boundaries being a pair of converging camming edges respectively engaged by said pointers through said slot.

6. An objective according to claim 4 wherein said housing is provided with an elongated window forming part of said indicator means in the region of said scale, said boundaries defining a pair of converging surface zones of distinctive appearance viewable through said window.

7. An objective according to claim 2 wherein said member is a radially displaceable stud carried by said control means, said coupling means linking said ring with said stud for radially displacing the latter upon rotation of said ring.

8. An objective according to claim 7 wherein said stud is spring-loaded and depressible against its spring force for rotating said ring through the intermediary of said coupling means.

9. An objective according to claim 8 wherein said coupling means comprises an arcuate lever.

10. An objective according to claim 8, further comprising presettable stop means engageable with said ring for limiting its spring-urged rotation upon release of said stud.

11. An objective according to claim 7 wherein said stud is substantially wedge-shaped, said indicator means further including a pair of swingable arms in camming engagement with opposite edges of said stud.

12. An objective according to claim 11 wherein said arms are provided with extremities displaceable in mutually opposite directions across said scale upon radial movement of said stud.

References Cited by the Examiner
UNITED STATES PATENTS
3,002,440   10/61   Baur _____ 95—44

NORTON ANSHER, *Primary Examiner.*

JOHN M. HORAN, *Examiner.*